US012780133B2

(12) United States Patent
Funada et al.

(10) Patent No.: US 12,780,133 B2
(45) Date of Patent: Nov. 3, 2026

(54) REINFORCING UNIT AND REINFORCING MEMBER

(71) Applicant: SUMITOMO HEAVY INDUSTRIES, LTD., Tokyo (JP)

(72) Inventors: Ryuichi Funada, Dublin, OH (US); Kiwoong Nam, Columbus, OH (US); Norieda Ueno, Niihama (JP); Hiroyuki Kumeno, Niihama (JP); Kozaburo Sakamaki, Niihama (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 364 days.

(21) Appl. No.: 18/398,091

(22) Filed: Dec. 27, 2023

(65) Prior Publication Data

US 2024/0123929 A1 Apr. 18, 2024

Related U.S. Application Data

(63) Continuation of application No. PCT/JP2022/018837, filed on Apr. 26, 2022, and a (Continued)

(51) Int. Cl.
*B60R 19/18* (2006.01)

(52) U.S. Cl.
CPC ...... *B60R 19/18* (2013.01); *B60R 2019/1806* (2013.01)

(58) Field of Classification Search
CPC ........................ B60R 19/18; B60R 2019/1806
See application file for complete search history.

(56) References Cited

U.S. PATENT DOCUMENTS 10,967,909 B2 4/2021 Hoshuyama et al.
2003/0155806 A1 8/2003 Goto et al.
(Continued)

FOREIGN PATENT DOCUMENTS

CN 112469597 A 3/2021
DE 102 05 627 A1 8/2003
(Continued)

OTHER PUBLICATIONS

International search report of PCT/JP2022/018837 Mailed on Jun. 14, 2022.
(Continued)

*Primary Examiner* — Taras P Bemko
(74) *Attorney, Agent, or Firm* — WTA IP Law P.C.

(57) ABSTRACT

A reinforcing unit that is mounted on a main body frame includes a beam material and one or more reinforcing members that are mounted on an outside of the beam material. The beam material substantially has a continuously closed cross-sectional shape that includes an inner surface portion that is provided on a frame side where the main body frame is located, an outer surface portion that is provided on a counter-frame side that is a side opposite to the main body frame, and a side surface portion that connects the inner surface portion and the outer surface portion. A flange portion is formed at the side surface portion and protrudes outward. The reinforcing member selectively comes into contact with and restrains the side surface portion that bulges in response to an impact load at the outer surface portion.

15 Claims, 15 Drawing Sheets

Related U.S. Application Data continuation-in-part of application No. 17/363,019, filed on Jun. 30, 2021, now abandoned.

(56) References Cited

U.S. PATENT DOCUMENTS

| | | | | |
|---|---|---|---|---|
| 2010/0194146 | A1 | 8/2010 | Nishimura | |
| 2013/0175813 | A1* | 7/2013 | Mana | B60R 19/18 293/120 |
| 2016/0325701 | A1* | 11/2016 | Yabu | B60R 19/18 |
| 2017/0036623 | A1 | 2/2017 | Suzumori | |
| 2020/0031208 | A1 | 1/2020 | Otsuka | |
| 2020/0102016 | A1* | 4/2020 | Hoshuyama | B62D 21/157 |
| 2021/0094493 | A1* | 4/2021 | Nogiwa | B60R 19/04 |
| 2021/0162940 | A1 | 6/2021 | Sonobe et al. | |
| 2022/0177034 | A1* | 6/2022 | Sakaidani | B62D 21/15 |
| 2024/0010147 | A1* | 1/2024 | Otani | B60R 19/18 |

FOREIGN PATENT DOCUMENTS

| | | | |
|---|---|---|---|
| DE | 10 2014 018862 | B4 | 8/2018 |
| JP | 2003-220909 | A | 8/2003 |
| JP | 2003-237507 | A | 8/2003 |
| JP | 2011-131791 | A | 7/2011 |
| JP | 2018-075956 | A | 5/2018 |
| JP | 2018-176889 | A | 11/2018 |
| KR | 10-2018-0105018 | A | 9/2018 |
| WO | WO 2018/190312 | A1 | 10/2018 |
| WO | WO 2019/240214 | A1 | 12/2019 |

OTHER PUBLICATIONS

Office Action of the corresponding KR Application No. 10-2023-7041493, mailed on May 6, 2026.

Office Action of the corresponding CN Application No. 202280040284.X Mailed on May 7, 2026.

European search report of EP Application No. 22832590.8 Mailed on Sep. 4, 2024.

* cited by examiner

REINFORCING UNIT AND REINFORCING MEMBER

CROSS-REFERENCE TO RELATED APPLICATIONS

This is a bypass continuation of International PCT Application No. PCT/JP2022/018837, filed on Apr. 26, 2022, which claims priority to U.S. patent application Ser. No. 17/363,019, filed on Jun. 30, 2021, which are incorporated by reference herein in their entirety.

BACKGROUND

Technical Field

A certain embodiment of the present disclosure relates to a reinforcing unit.

Description of Related Art

A reinforcing unit such as a bumper beam is sometimes incorporated into a structure such as a vehicle in order to reduce impact that occurs at the time of collision with an external object. The reinforcing unit usually includes a beam material that is mounted on a main body frame such as a vehicle body frame.

SUMMARY

A reinforcing unit according to an embodiment of the present disclosure is a reinforcing unit that is mounted on a main body frame, including: a beam material; and one or more reinforcing members that are mounted on an outside of the beam material, in which the beam material substantially has a continuously closed cross-sectional shape that includes an inner surface portion that is provided on a frame side where the main body frame is located, an outer surface portion that is provided on a counter-frame side that is a side opposite to the main body frame, and a side surface portion that connects the inner surface portion and the outer surface portion, and the reinforcing member restrains bulging deformation of the side surface portion in a case where an impact load is input to the outer surface portion.

A reinforcing member according to an embodiment of the present disclosure is a reinforcing member that reinforces a beam material which is mounted on a main body frame, in which the beam material substantially has a continuously closed cross-sectional shape that includes an inner surface portion that is provided on a frame side where the main body frame is located, an outer surface portion that is provided on a counter-frame side that is a side opposite to the main body frame, and a side surface portion that connects the inner surface portion and the outer surface portion, and the reinforcing member restrains bulging deformation of the side surface portion in a case where an impact load is input to the outer surface portion.

DETAILED DESCRIPTION

Figure 1:
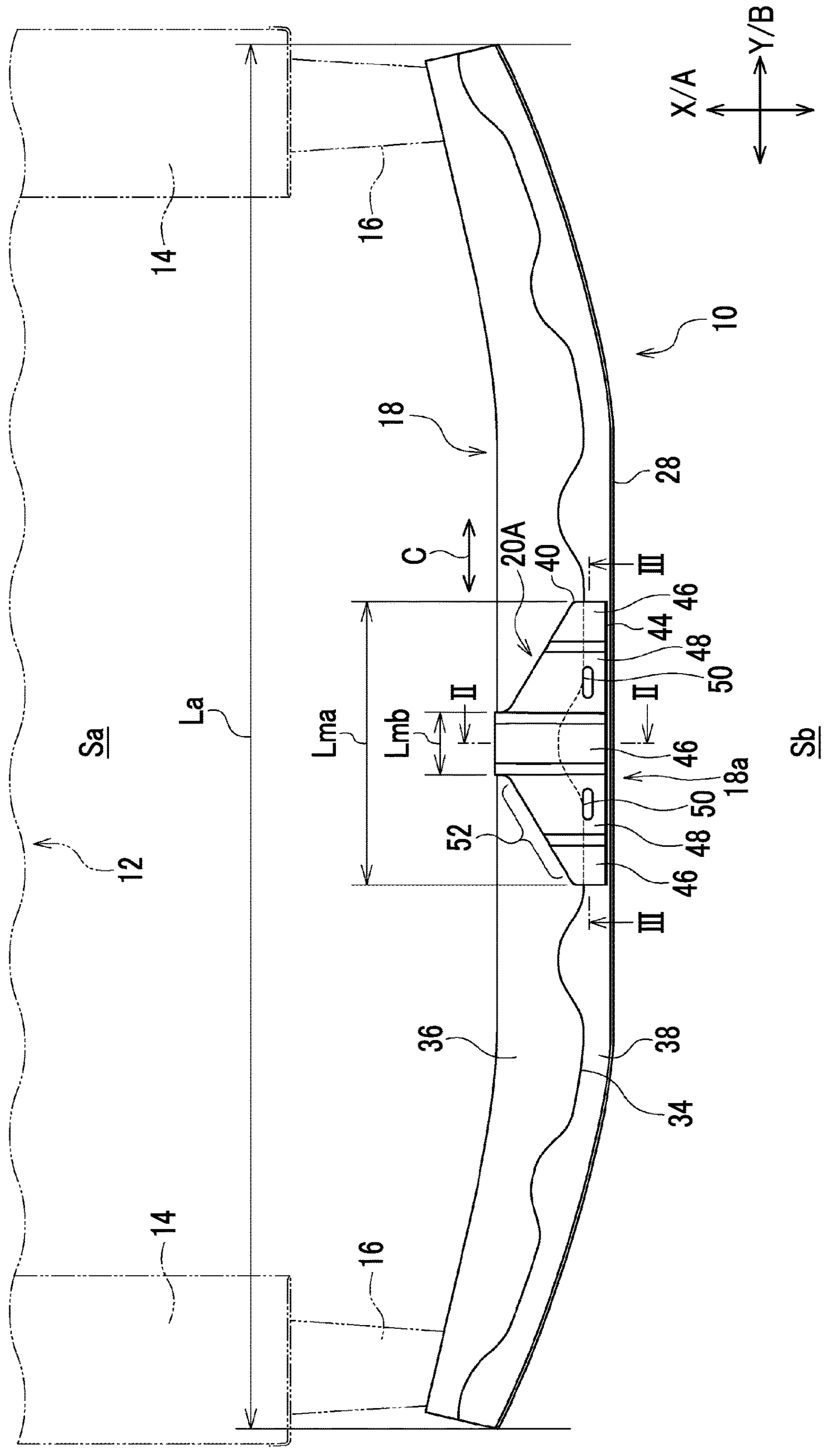
FIG. 1 is a top view of a reinforcing unit of an embodiment.

The reinforcing unit sometimes includes, in addition to the beam material, a reinforcing member that reinforces the beam material in order to improve impact absorption performance (refer to, for example, the related art). The inventors of the present application have found a new idea for obtaining good impact absorption performance in such a reinforcing unit.

It is desirable to provide a technique capable of obtaining good impact absorption performance in a reinforcing unit.

Hereinafter, an embodiment will be described. The same components are denoted by the same reference numerals, and overlapping description is omitted. In each drawing, for convenience of description, the components are appropriately omitted, enlarged, or reduced. The drawings shall be viewed according to the directions of the symbols.

Figure 2:
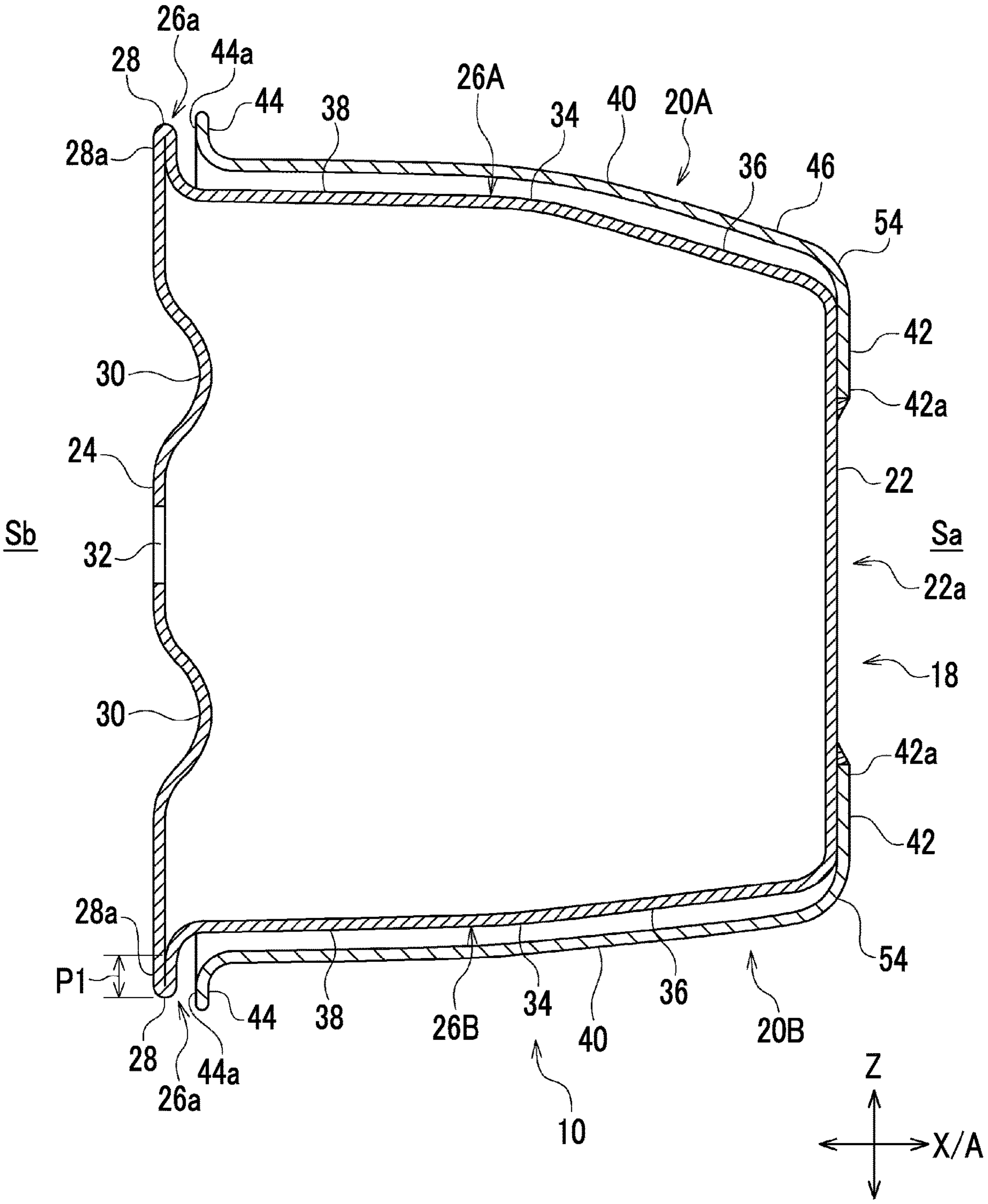
FIG. 2 is a sectional view taken along line II-II of FIG. 1.

FIGS. 1 and 2 will be referred to. A reinforcing unit 10 is mounted on a main body frame 12 that is a part of a structure. The main body frame 12 supports the other portions of the structure. In the present embodiment, an example will be described in which the structure is a vehicle such as an automobile and the main body frame 12 is a vehicle body frame that supports the other portions of the vehicle. A specific example of the structure is not particularly limited and may be, for example, a crane. The reinforcing unit 10 of the present embodiment is a bumper beam that is used for a front bumper of a vehicle. The main body frame 12 in the present embodiment includes a pair of right and left side members 14 and a cross member (not shown) that connects the pair of side members 14. The reinforcing unit 10 is mounted on the main body frame 12 through a crash can 16.

Hereinafter, the positional relationship of the reinforcing unit 10 will be described using a front-rear direction X, a right-left direction Y, and an up-down direction Z which are orthogonal to each other. In a case where the reinforcing unit 10 is used in a vehicle, these directions X, Y, and Z correspond to the front-rear direction, right-left direction, and up-down direction of the vehicle. In this case, the front-rear direction X and the right-left direction Y are horizontal directions orthogonal to each other. The up-down direction Z is a vertical direction. One of the front-rear direction X and the right-left direction Y is defined as a first specific direction A, and the other is defined as a second specific direction B. The up-down direction Z is defined as a third specific direction. The reinforcing unit 10 is disposed on the outside in the first specific direction A with respect to the main body frame 12. The first specific direction A in the present embodiment is the front-rear direction X. The outside in the first specific direction A refers to the side (the front side in the present embodiment) away from the main body frame 12 in the first specific direction A. Hereinafter, the side where the main body frame 12 is located with respect to the reinforcing unit 10 in the first specific direction A is referred to as a frame side Sa (the rear side in the present embodiment). Further, the side opposite to the main body frame 12 in the first specific direction A is referred to as a counter-frame side Sb (the front side in the present embodiment). It can be said that the second specific direction B is a direction in which a beam material 18 (described later) extends as a whole, the first specific direction A is a direction of coming close to or going away from the main body frame 12, which is orthogonally to the second specific direction B, and the third specific direction (the up-down direction Z) is a direction orthogonal to these directions.

The reinforcing unit 10 has a role of absorbing impact occurring at the time of collision with an external object. The reinforcing unit 10 includes the beam material 18 that is mounted on the main body frame 12, and one or more reinforcing members 20A and 20B that are mounted on the beam material 18. The reinforcing members 20A and 20B have a role of reinforcing the beam material 18.

The beam material 18 is a long body extending in the second specific direction B (the right-left direction Y in the present embodiment) as a whole. The beam material 18 has an arc shape that protrudes to the counter-frame side Sb as a whole. Each of both end portions of the beam material 18 is fixed to the main body frame 12.

The cross section orthogonal to a longitudinal direction C of the beam material 18 has a closed cross-sectional shape, and has a polygonal shape as a whole. The beam material 18 in the present embodiment has a continuously closed cross-sectional shape that is seamlessly continuous in a range over the entire circumference around the center line thereof. It can be said that the beam material 18 is configured with a single pipe material. The thickness of the beam material 18 is not particularly limited. However, it is, for example, 1.0 mm or more and 2.3 mm or less.

The beam material 18 is made of, for example, a steel material such as high-strength steel or ultra-high-strength steel, that is, metal. The microstructure of the beam material 18 has a hardened structure such as a-martensite or a tempered structure such as sorbite or troostite, as a main phase. The beam material 18 having a continuously closed cross-sectional shape and having such a microstructure as a main phase is configured with an integral molding product that is obtained by hot air blow forming (described later).

The beam material 18 is provided with an inner surface portion 22 that is provided on the frame side Sa, an outer surface portion 24 that is provided on the counter-frame side Sb, a pair of side surface portions 26A and 26B connecting the inner surface portion 22 and the outer surface portion 24, and a flange portion 28 that is formed at the side surface portions 26A and 26B.

The inner surface portion 22 has a plate shape facing the frame side Sa as a whole. The outer surface portion 24 has a plate shape facing the counter-frame side Sb as a whole. The inner surface portion 22 and the outer surface portion 24 face each other in the first specific direction A (the front-rear direction X).

The outer surface portion 24 functions as a surface that antecedently receives an impact load when an external object collides with the reinforcing unit 10 from the counter-frame side Sb. The outer surface portion 24 is provided with a plurality of groove portions 30 extending along the longitudinal direction of the beam material 18. The plurality of groove portions 30 contribute to improvement of the impact absorption performance by improvement of the cross-sectional performance of the outer surface portion 24. The plurality of groove portions 30 are recessed to the frame side Sa in the outer surface portion 24. A through-hole 32 through which a fastening member such as a bolt passes may be formed in the outer surface portion 24.

The pair of side surface portions 26A and 26B include an upper side surface portion 26A that is disposed on the upper side and a lower side surface portion 26B that is disposed on the lower side. Each of the side surface portions 26A and 26B in the present embodiment is provided with a corner portion 34 that is convex outward in the up-down direction Z, a frame-side surface portion 36 that extends from the corner portion 34 to the frame side Sa, and a counter-frame-side surface portion 38 that extends from the corner portion 34 to the counter-frame side Sb. The corner portion 34 of each of the side surface portions 26A and 26B has a concave-convex shape with an undulation in the first specific direction A (the front-rear direction X) as it goes toward the longitudinal direction C of the beam material 18 when viewed from the up-down direction Z (refer to FIG. 1).

The flange portion 28 contributes to the improvement of the impact absorption performance by the improvement of the cross-sectional performance of the beam material 18. The flange portion 28 protrudes outward in the up-down direction Z from the side surface portions 26A and 26B of the beam material 18. The flange portion 28 is formed by bending a part of the beam material 18 so as to be folded. The flange portion 28 in the present embodiment is formed at end portions 26*a* on the counter-frame side of the side surface portions 26A and 26B. A portion 28*a* on the counter-frame side Sb of the flange portion 28 is continuous with the outer surface portion 24 as a part of the outer surface portion 24.

In the beam material 18 that is obtained by the hot air blow forming, the protrusion amount P1 of the flange portion 28 can be set to, for example, 5 mm or less in a case where it is not provided for the purpose of welding. This means that the protrusion amount P1 is set to a size smaller than the protrusion amount (in a range of about 15 mm to 20 mm) of a general flange portion 28 required as a spot welding margin. This spot welding margin is required in a case where the beam material 18 is obtained by welding a plurality of metal plates. The protrusion amount P1 here means the dimension in the up-down direction Z of the location where a part of the beam material 18 is folded in the flange portion 28.

In the present embodiment, one or more reinforcing members 20A and 20B include an upper reinforcing member 20A and a lower reinforcing member 20B that is a separate body from the upper reinforcing member 20A. Since the configuration of the lower reinforcing member 20B when viewed from below is the same as the configuration of the upper reinforcing member 20A when viewed from above, the illustration thereof is omitted here.

The upper reinforcing member 20A covers the upper side surface portion 26A of the beam material 18 from the outside (the upper side) in the up-down direction Z. The upper reinforcing member 20A is provided along the upper side surface portion 26A of the beam material 18. The upper reinforcing member 20A is provided to extend in the longitudinal direction C of the beam material 18 along the upper side surface portion 26A of the beam material 18. The lower reinforcing member 20B covers the lower side surface portion 26B of the beam material 18 from the outside (the lower side) in the up-down direction Z. The lower reinforcing member 20B is provided along the lower side surface portion 26B of the beam material 18. The lower reinforcing member 20B is provided to extend in the longitudinal direction C of the beam material 18 along the lower side surface portion 26B of the beam material 18. The upper reinforcing member 20A and the lower reinforcing member 20B are disposed with a gap therebetween in the up-down direction Z. Each of the reinforcing members 20A and 20B is configured with an integral molding product such as a pressed product of a metal plate.

The reinforcing members 20A and 20B partially cover the beam material 18 in a part of the range in the longitudinal direction C of the beam material 18. The reinforcing members 20A and 20B cover at least a central portion 18*a* in the longitudinal direction of the beam material 18, which is easily deformed at the time of collision with an external object. The dimension in the right-left direction Y (the second specific direction B) of the beam material 18 is defined as a dimension La. In this case, the reinforcing members 20A and 20B in the present embodiment cover the beam material 18 in a range in the second specific direction B, which is equal to or smaller than half of the dimension La.

The reinforcing members 20A and 20B do not cover the outer surface portion 24 of the beam material 18 from the counter-frame side Sb. That is, the reinforcing members 20A and 20B are not disposed at a position overlapping the outer surface portion 24 of the beam material 18 on the counter-frame side Sb.

Each of the reinforcing members 20A and 20B is provided with a side plate portion 40 that covers each of the side surface portions 26A and 26B of the beam material 18 from the outside in the up-down direction Z, an inner plate portion 42 that is disposed on the frame side Sa with respect to the inner surface portion 22 of the beam material 18, and a receiving portion 44 that is provided at an outer end portion 40*a* that is located on the counter-frame side Sb of the side plate portion 40.

The side plate portion 40 extends from the frame side Sa toward the counter-frame side Sb. The side plate portion 40 covers each of the side surface portions 26A and 26B from the outside in the up-down direction Z in a range that includes the corner portion 34 of the beam material 18.

Figure 3:
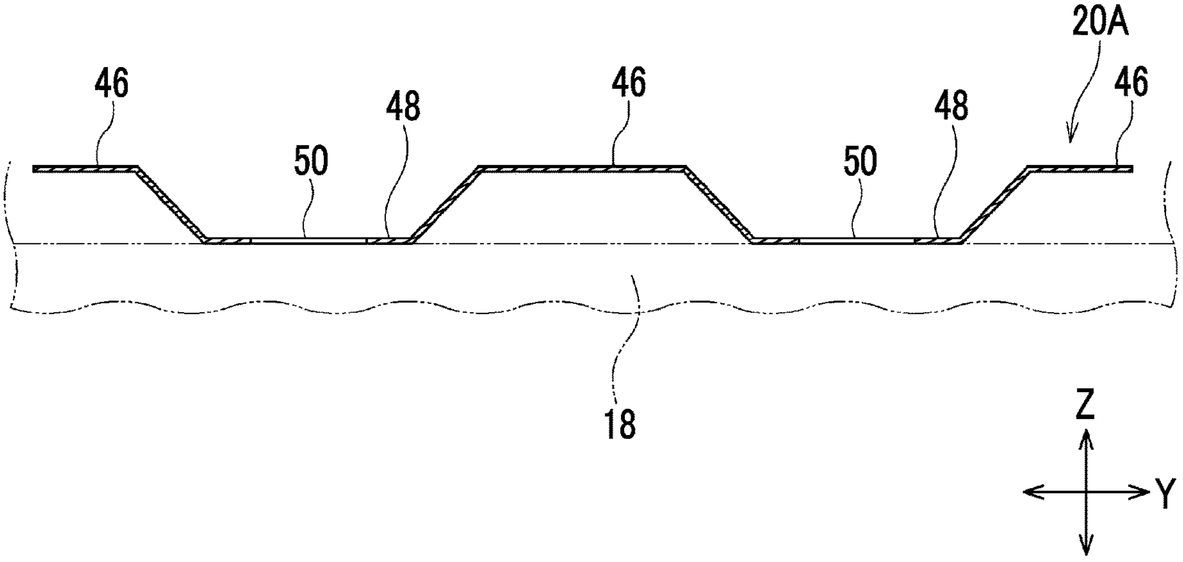
FIG. 3 is a diagram schematically showing a part of a cross section along line of FIG. 1.

FIGS. 1 and 3 will be referred to. The side plate portion 40 is formed such that a protrusion portion 46 and a recessed portion 48 that undulate in the up-down direction Z are alternately arranged in the right-left direction Y (the second specific direction B). The protrusion portion 46 protrudes to the outside in the up-down direction Z (the side away from the beam material 18). The recessed portion 48 is recessed to the inside in the up-down direction Z (the side approaching the beam material 18). In the present embodiment, three protrusion portions 46 and two recessed portions 48 are formed so as to be arranged alternately. A welding hole 50 is formed in the recessed portion 48. The recessed portion 48 is in contact with the counter-frame-side surface portion 38 of the beam material 18, and the protrusion portion 46 is disposed at an interval with respect to the beam material 18. The side plate portion 40 is fixed to each of the side surface portions 26A and 26B of the beam material 18 by welding the inner peripheral portion of the welding hole 50.

The side plate portion 40 is provided with a dimension change portion 52 that gradually reduces a dimension in the right-left direction Y (the second specific direction B) as it goes toward the frame side Sa. The dimension change portion 52 in the present embodiment is provided in a continuous range from the end portion of the frame side Sa toward the counter-frame side Sb in the side plate portion 40.

The maximum dimension in the right-left direction Y (the second specific direction B) of the side plate portion 40 is set to be Lma, and the maximum dimension in the right-left direction Y (the second specific direction B) of the inner plate portion 42 is set to be Lmb. In the present embodiment, the maximum dimension Lmb of the inner plate portion 42 is a size equal to or less than half of the maximum dimension Lma of the side plate portion 40.

FIG. 2 will be referred to. The inner plate portion 42 is connected to the side plate portion 40 through a bent portion 54, and thus the side plate portion 40 and the inner plate portion 42 form an L shape as a whole. The inner plate portion 42 covers an edge portion in the up-down direction Z of the inner surface portion 22 of the beam material 18 from the frame side Sa, and does not cover a central portion 22*a* in the up-down direction Z of the inner surface portion 22 from the frame side Sa. That is, the inner plate portion 42 is not disposed at a position overlapping the central portion 22*a* of the inner surface portion 22 of the beam material 18 in the front-rear direction X (the first specific direction A).

The inner plate portion 42 is continuous with the protrusion portion 46 that is located on the center side in the right-left direction Y (the second specific direction B) of the side plate portion 40. The inner plate portion 42 is fixed to the inner surface portion 22 of the beam material 18 by line-welding an end edge portion 42*a* of the inner plate portion 42.

The receiving portion 44 is formed by bending the outer end portion 40*a* of the side plate portion 40 outward in the up-down direction Z. The receiving portion 44 is disposed at an interval with respect to the flange portion 28 of the beam material 18 on the frame side Sa. The receiving portion 44 is provided with a surface portion 44*a* that is located at a position overlapping the flange portion 28 in the front-rear direction X (the first specific direction A) and faces the flange portion 28 in the front-rear direction X. As will be described later, the receiving portion 44 has a role of receiving the flange portion 28 of the beam material 18 when the flange portion 28 tries to be displaced to the frame side Sa. From such a relationship, the receiving portion 44 is provided in the vicinity of the flange portion 28 of the beam material 18. The receiving portion 44 is provided on the counter-frame side Sb with respect to the corner portion 34 of each of the side surface portions 26A and 26B of the beam material 18.

Next, the operation and effect of the reinforcing unit 10 will be described.

Figure 4A:
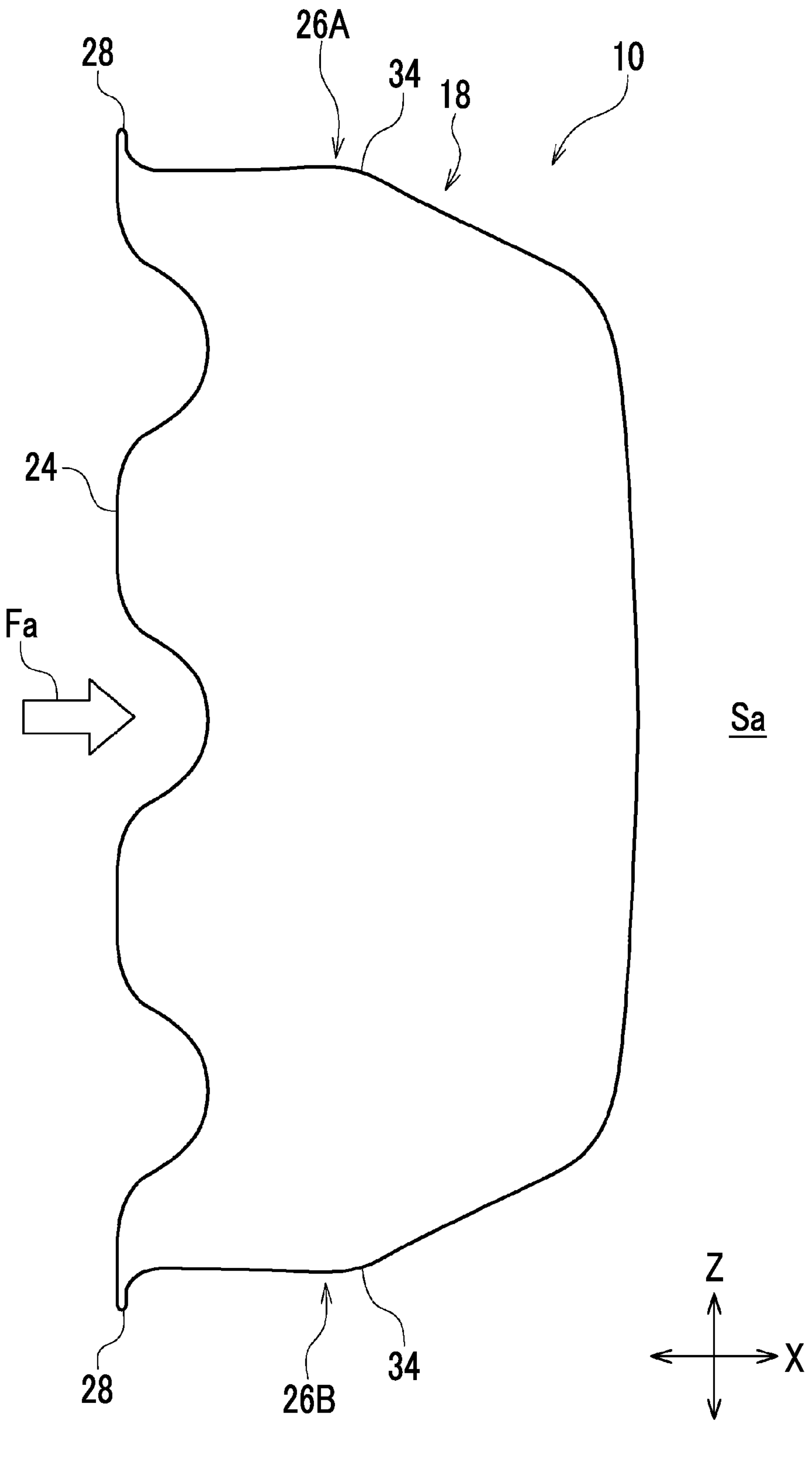
FIG. 4A is a sectional view schematically showing a reinforcing member of a reference form.
Figure 4B:
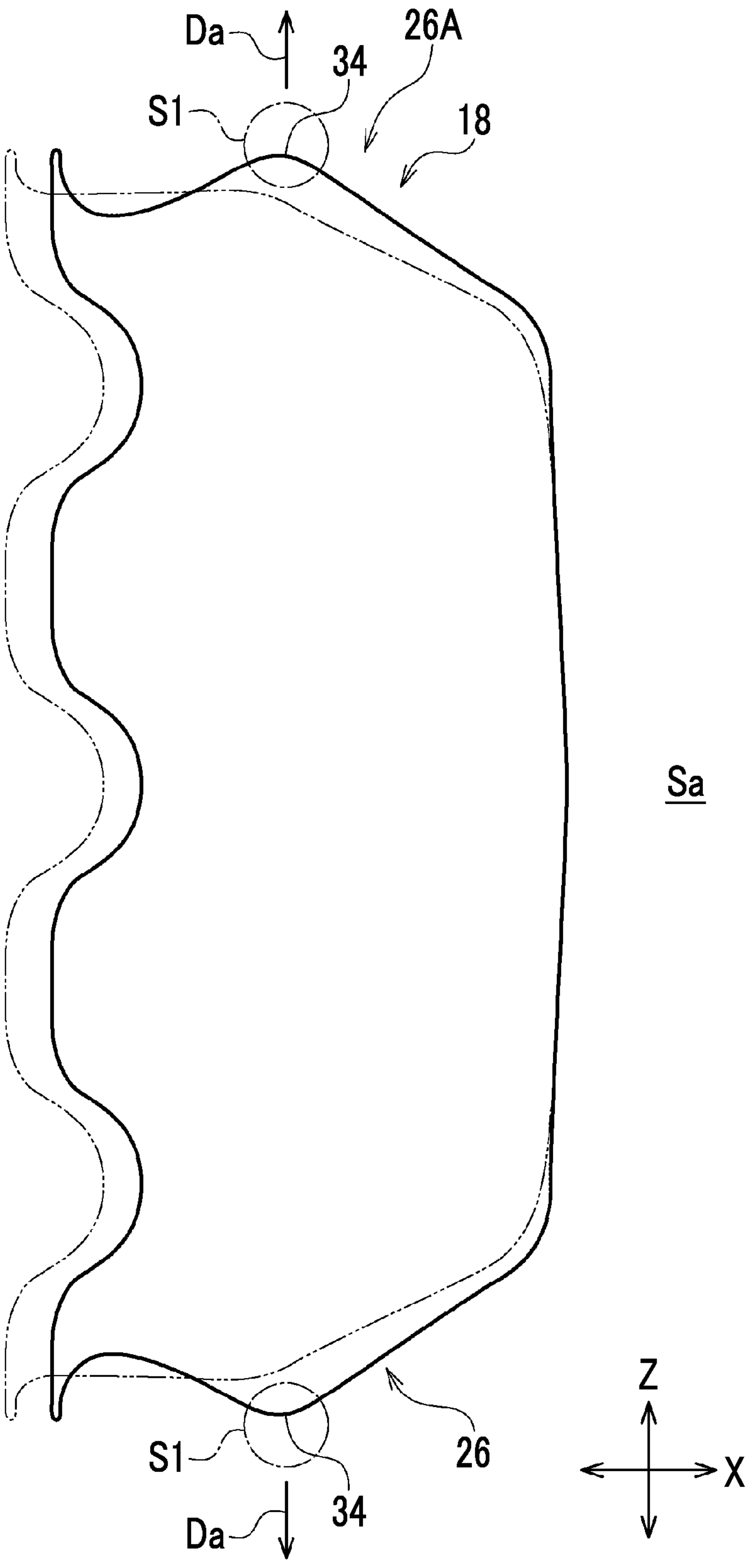
FIG. 4B is a diagram schematically showing a state where the reinforcing member of the reference form is being deformed.
Figure 4C:
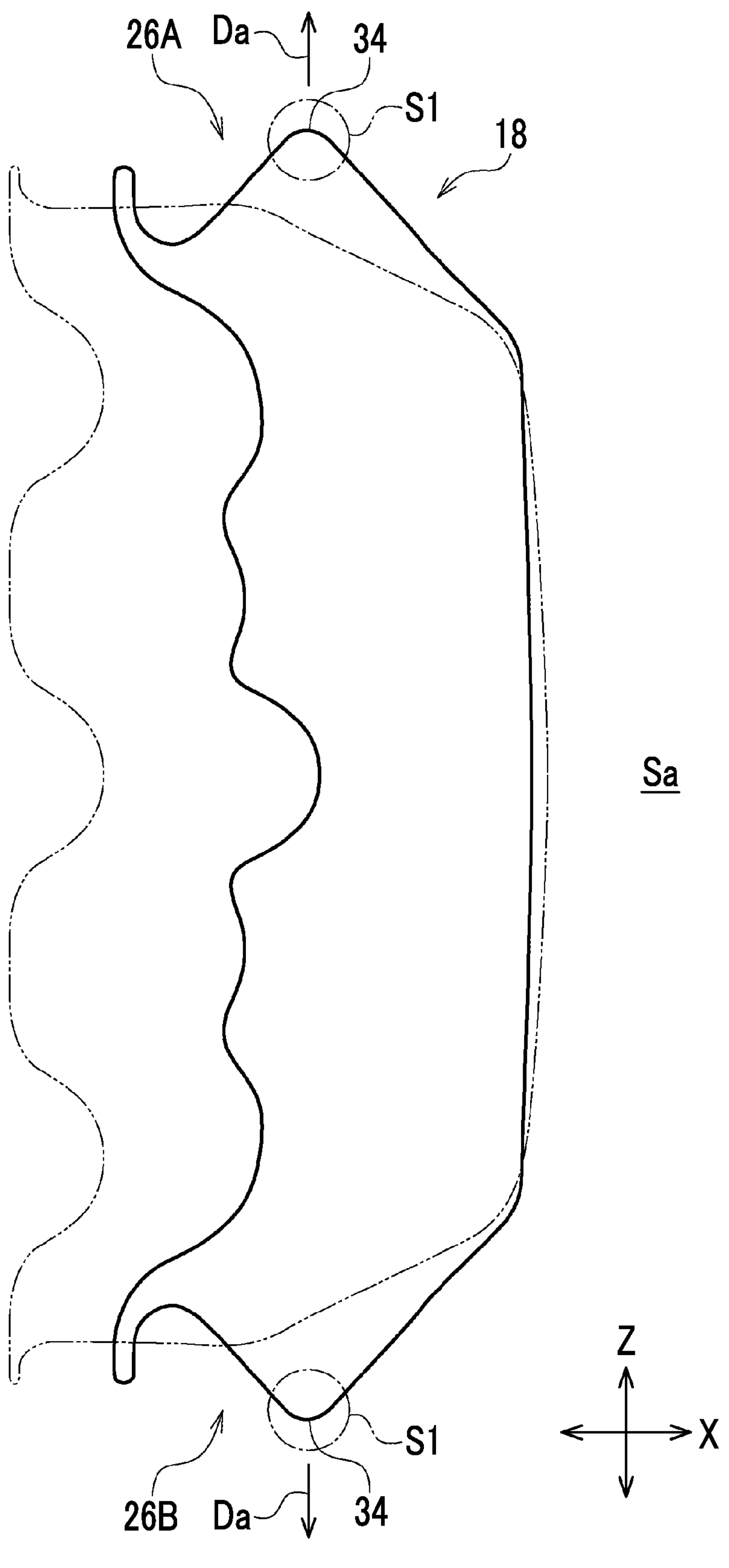
FIG. 4C is a diagram schematically showing a state where the reinforcing member of the reference form is being deformed.

First, the deformation behavior of a reinforcing unit 10 of a reference form will be described. FIGS. 4A, 4B, and 4C will be referred to. The reinforcing unit 10 of the reference form is provided with the beam material 18 having the same structure as that in the embodiment, and is not provided with the reinforcing members 20A and 20B. In a case where an impact load Fa toward the frame side Sa is input to the outer surface portion 24 of the beam material 18, the side surface portions 26A and 26B of the beam material 18 are subjected to bulging deformation so as to bulge in an outward direction Da in the up-down direction (refer to a range S1). In this case, in a case where the beam material 18 has the flange portion 28, the bulging deformation of the side surface portions 26A and 26B easily occurs with the corner portions 34 of the side surface portions 26A and 26B with the starting points, as compared with a case where the beam material 18 does not have the flange portion 28. This is a knowledge newly obtained by an analytical method.

Next, the deformation behavior of the reinforcing unit 10 of the embodiment will be described. FIGS. 5A, 5B, 5C, and 5D will be referred to. Here, the relationship between the upper side surface portion 26A of the beam material 18 and the upper reinforcing member 20A is shown. The following description also applies in common to the relationship between the lower side surface portion 26B of the beam material 18 and the lower reinforcing member 20B.

As described above, in a case where the impact load Fa is input to the outer surface portion 24 of the beam material 18, the side surface portions 26A and 26B of the beam material 18 try to perform bulging deformation in the outward direction Da in the up-down direction. In this case, the side plate portions 40 of the reinforcing members 20A and 20B hit against the side surface portions 26A and 26B of the beam material 18 from the outside, thereby restraining the bulging deformation (refer to a range S2). That is, the side plate portions 40 of the reinforcing members 20A and 20B suppress the bulging deformation of the side surface portions 26A and 26B of the beam material 18. In this way, the early progress of plastic deformation in a local range in the longitudinal direction C of the outer surface portion 24 of the beam material 18 can be suppressed, and the plastic deformation of the beam material 18 in a wider range in the longitudinal direction C can be promoted. Eventually, good impact absorption performance of the reinforcing unit 10 as a whole can be obtained.

Figure 5A:
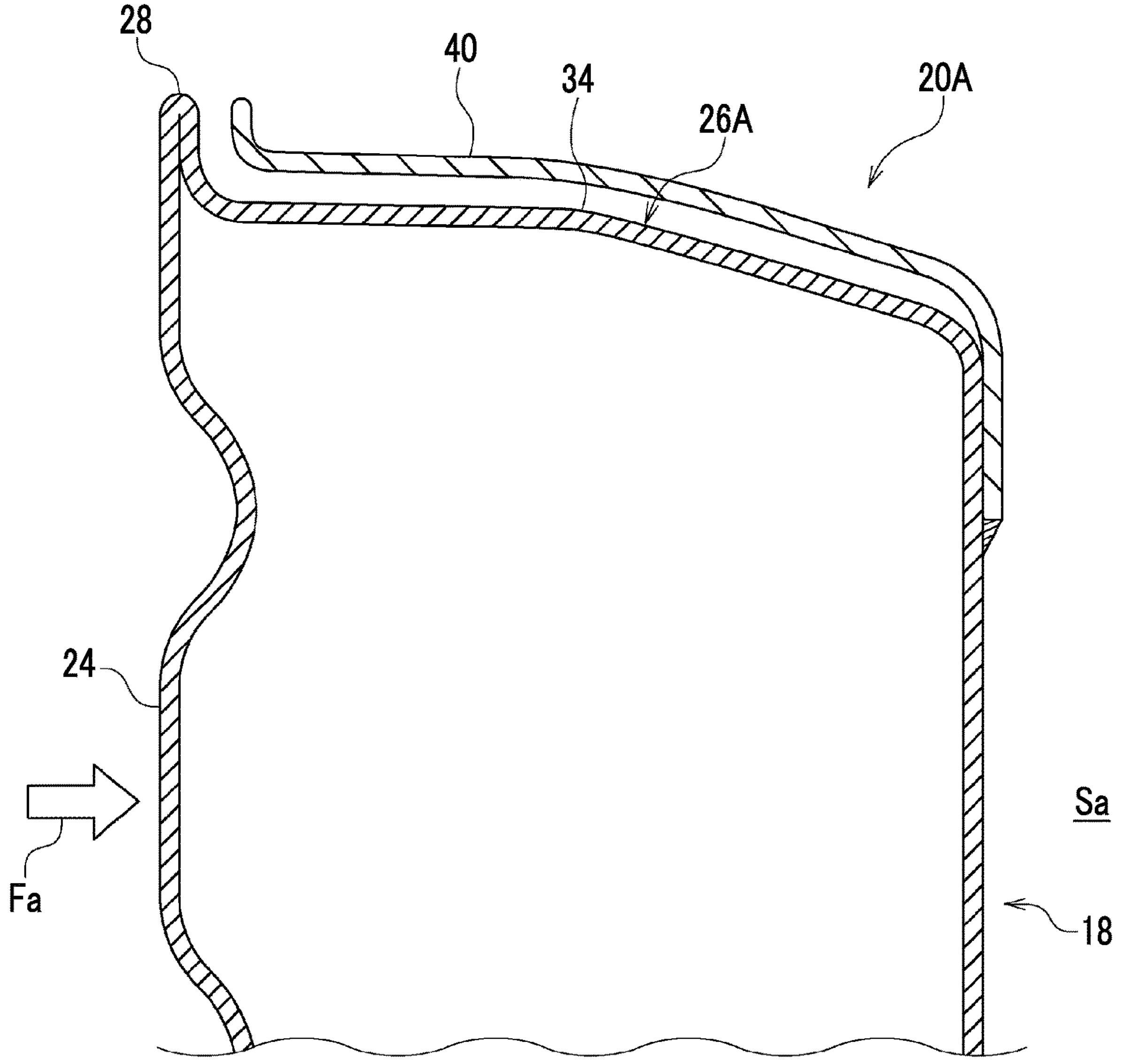
FIG. 5A is a sectional view schematically showing the reinforcing member of the embodiment.
Figure 5B:
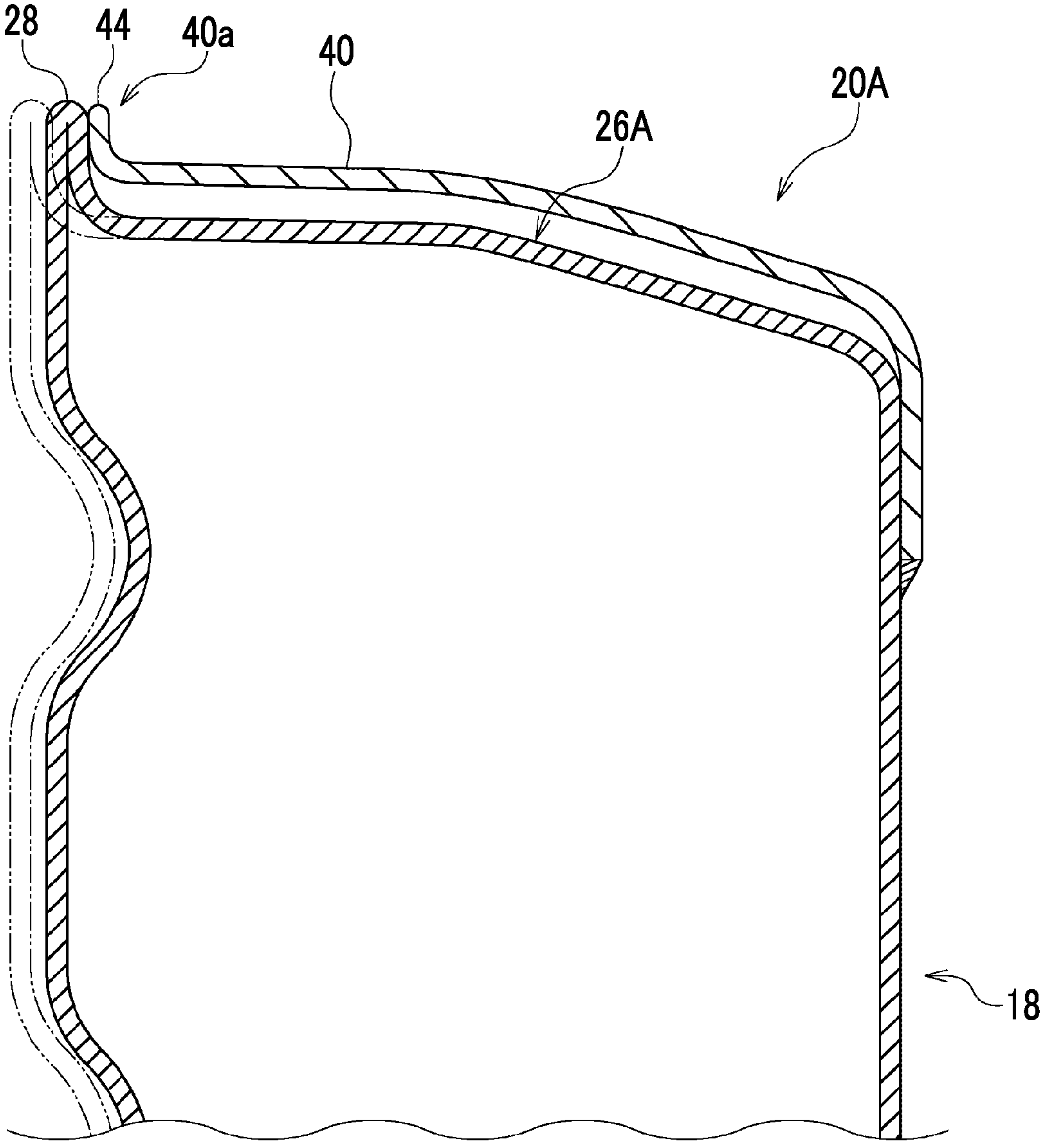
FIG. 5B is a first explanatory diagram schematically showing a state where the reinforcing member of the embodiment is being deformed.
Figure 5C:
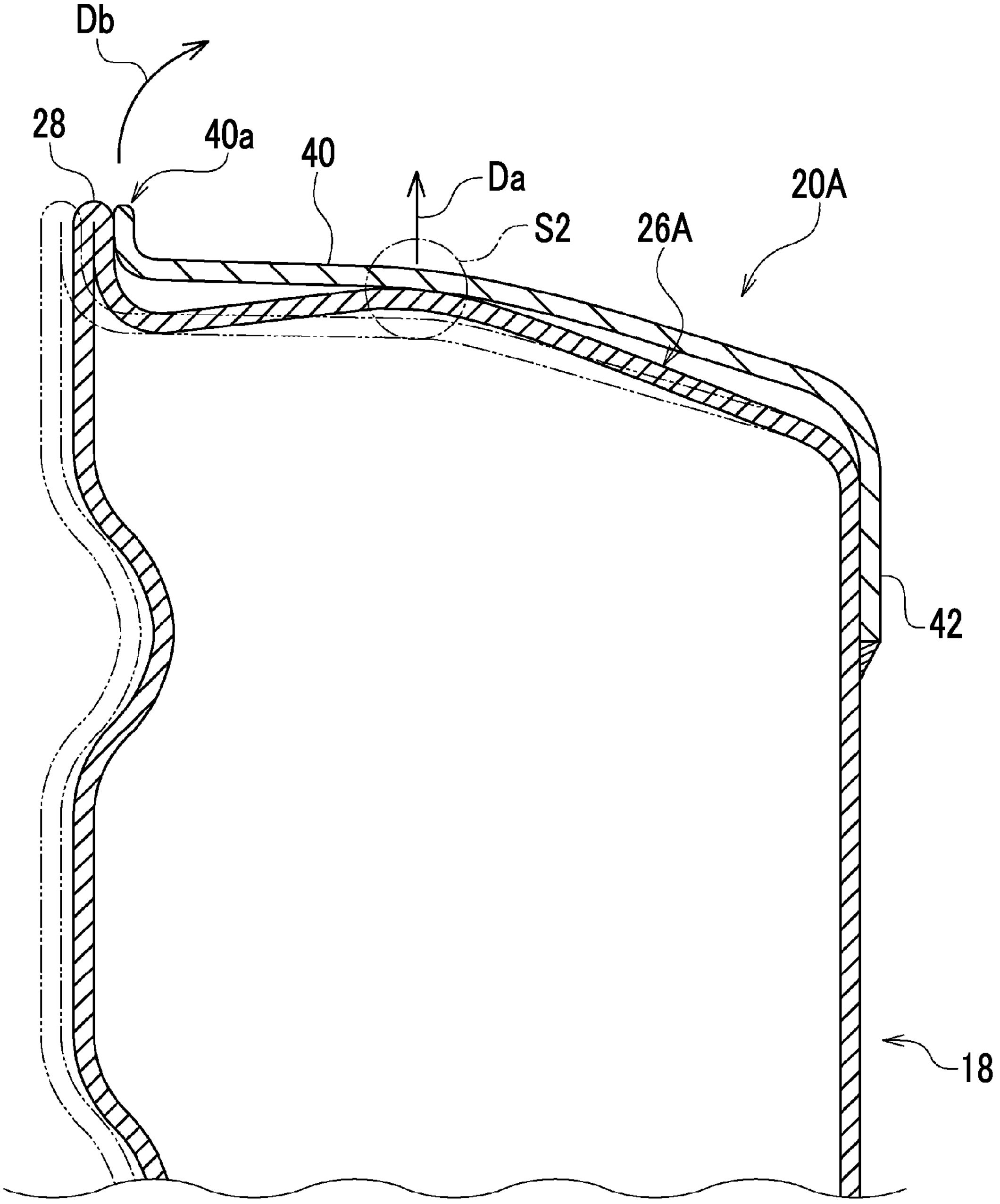
FIG. 5C is a second explanatory diagram schematically showing a state where the reinforcing member of the embodiment is being deformed.
Figure 5D:
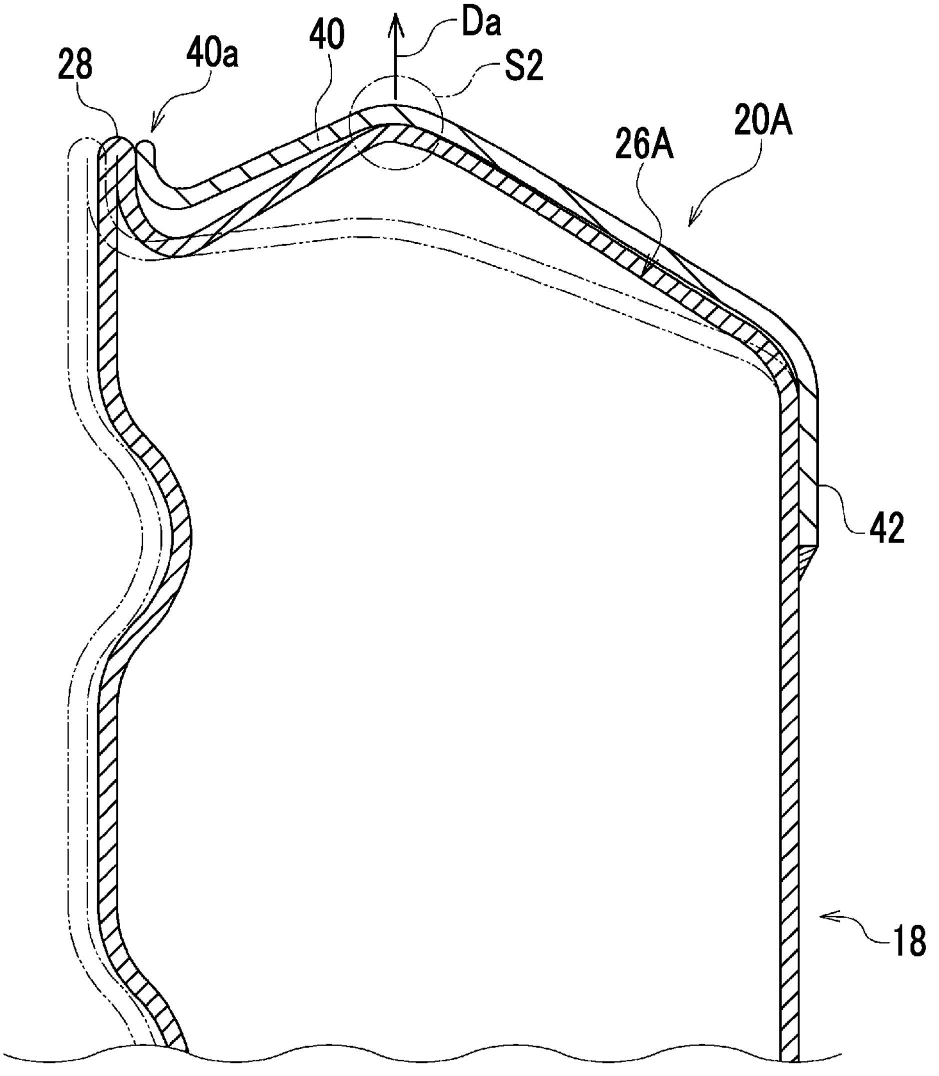
FIG. 5D is a third explanatory diagram schematically showing a state where the reinforcing member of the embodiment is being deformed.

Here, with the progress of the bulging deformation of the side surface portions 26A and 26B of the beam material 18, the flange portion 28 of the beam material 18 is displaced to the frame side Sa (refer to FIG. 5B). According to this, the flange portion 28 of the beam material 18 hits against the outer end portions 40*a* of the side plate portions 40 of the reinforcing members 20A and 20B. In the present embodiment, the flange portion 28 of the beam material 18 hits against the receiving portions 44 of the reinforcing members 20A and 20B. In this state, the flange portion 28 of the beam material 18 is displaced to the frame side Sa, so that the outer end portions 40*a* of the reinforcing members 20A and 20B can be pressed by the flange portion 28 of the beam material 18. In this way, the movement of the outer end portions 40*a* of the reinforcing members 20A and 20B to escape in an outward direction Db in the up-down direction can be restrained by the flange portion 28 of the beam material 18 (refer to FIG. 5C). Therefore, the reinforcing members 20A and 20B can continue to firmly restrain the bulging deformation of the side surface portions 26A and 26B of the beam material 18 in a state where the movement at the outer end portion 40*a* is restrained. In this case, while the side plate portions 40 of the reinforcing members 20A and 20B restrain the bulging deformation of the side surface portions 26A and 26B of the beam material 18, the side plate portions 40 perform bulging deformation in the outward direction Da in the up-down direction to follow the bulging deformation of the side surface portions 26A and 26B (refer to FIG. 5D).

In this way, the effect of restraining the bulging deformation of the beam material 18 by the reinforcing members 20A and 20B can be stably obtained for a long period of time. Eventually, good impact absorption performance of the reinforcing unit 10 as a whole can be stably obtained. This effect can be obtained even without the receiving portions 44 of the reinforcing members 20A and 20B. However, if there are the receiving portions 44, it becomes easy to stably obtain the effect.

In this manner, in the reinforcing unit 10 of the embodiment, the beam material 18 is plastically deformed antecedently instead of the reinforcing members 20A and 20B. Further, in the reinforcing unit 10 of the embodiment, the bulging deformation of the side surface portions 26A and 26B of the beam material 18 according to the preceding plastic deformation of the beam material 18 is restrained by the reinforcing members 20A and 20B, so that good impact absorption performance of the reinforcing unit 10 as a whole is obtained.

In obtaining good impact absorption performance in this manner, the reinforcing members 20A and 20B do not need to be plastically deformed antecedently, and it is not necessary to cover the entire outer surface portion 24 of the beam material 18 from the counter-frame side Sb. Further, in obtaining good impact absorption performance in this manner, it is enough if only a local location such as the outside of the side surface portions 26A and 26B of the beam material 18 in the cross section orthogonal to the longitudinal direction C is covered. Therefore, the range of covering the beam material 18 with the reinforcing members 20A and 20B can be reduced, and thus the weight saving of the reinforcing unit 10 as a whole can be aimed.

In obtaining good impact absorption performance in this manner, it is not necessary to cover the central portion 22*a* of the inner surface portion 22 of the beam material 18 from the frame side Sa. Also in this respect, the range of covering the beam material 18 with the reinforcing members 20A and 20B can be reduced, and thus weight saving of the reinforcing unit 10 as a whole can be aimed.

As described above, in a case where the beam material 18 has the flange portion 28, the bulging deformation of the side surface portions 26A and 26B of the beam material 18 easily occurs with the corner portions 34 of the side surface portions 26A and 26B as the starting points. Therefore, if the flange portion 28 and the corner portion 34 are provided in the side surface portions 26A and 26B of the beam material 18, it becomes easy to control the location where the bulging deformation occurs in the side surface portions 26A and 26B. Eventually, there is an advantage that it becomes easy to stably obtain the effect of restraining the bulging deformation of the beam material 18 by the reinforcing members 20A and 20B.

Each of the reinforcing members 20A and 20B is provided with the inner plate portion 42 that is disposed on the frame side Sa with respect to the inner surface portion 22 of the beam material 18, in addition to the side plate portion 40 that covers each of the side surface portions 26A and 26B of the beam material 18. Therefore, when the side plate portions 40 of the reinforcing members 20A and 20B try to be bent and deformed around an axis in the front-rear direction X (the first specific direction) following the bulging deformation of the side surface portions 26A and 26B of the beam material 18, the bending deformation of the side plate portion 40 can be restrained by the inner plate portion 42. In this way, for example, the early progress of deformation of the reinforcing members 20A and 20B can be suppressed. That is, the deformation of the side plate portions 40 of the reinforcing members 20A and 20B can be suppressed, and the effect of restraining the bulging deformation of the beam material 18 by the reinforcing members 20A and 20B can be stably obtained for a long period of time. Eventually, good impact absorption performance of the reinforcing unit 10 as a whole can be stably obtained.

One or more reinforcing members 20A and 20B includes the upper reinforcing member 20A and the lower reinforcing member 20B that is a separate body from the upper reinforcing member 20A. Therefore, the upper side surface portion 26A and the lower side surface portion 26B of the beam material 18 are covered with the individual reinforcing members 20A and 20B, so that the bulging deformation of the individual side surface portions 26A and 26B can be restrained. Eventually, better impact absorption performance of the reinforcing unit 10 as a whole can be obtained.

Along with this, the range of covering the inner surface portion 22 of the beam material 18 by the reinforcing members 20A and 20B can be narrowed as compared with a case where the upper side surface portion 26A and the lower side surface portion 26B of the beam material 18 are covered with a common reinforcing material. Eventually, the weight saving of the reinforcing unit 10 as a whole can be aimed.

Figure 6:
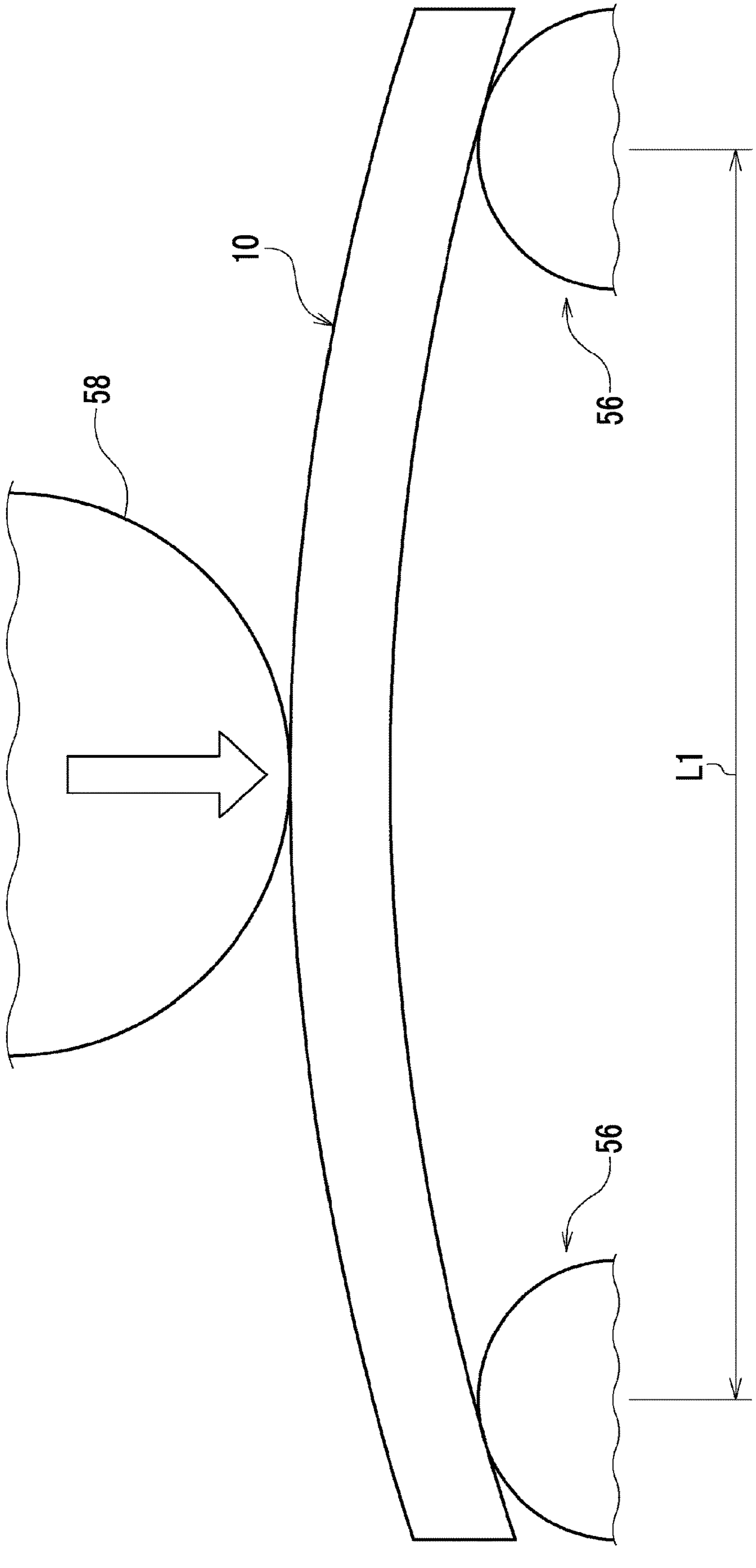
FIG. 6 is a schematic diagram showing a calculation model that is a prerequisite in FEM analysis.

Next, the analysis performed in order to explain the effect of the reinforcing unit 10 of the embodiment will be described. FIG. 6 will be referred to. In this analysis, LS-DYNA was used as analysis software, and FEM analysis reproducing a three-point bending test was performed. Both end portions of the reinforcing unit 10 were supported by rigid bodies 56 with a distance L1 between fulcrums being set to 892 mm. A load was applied from a rigid body 58 to the central portion of the reinforcing unit 10 under the conditions of a speed of 0.5 mm/sec and a maximum stroke of 100 mm.

Figure 7:
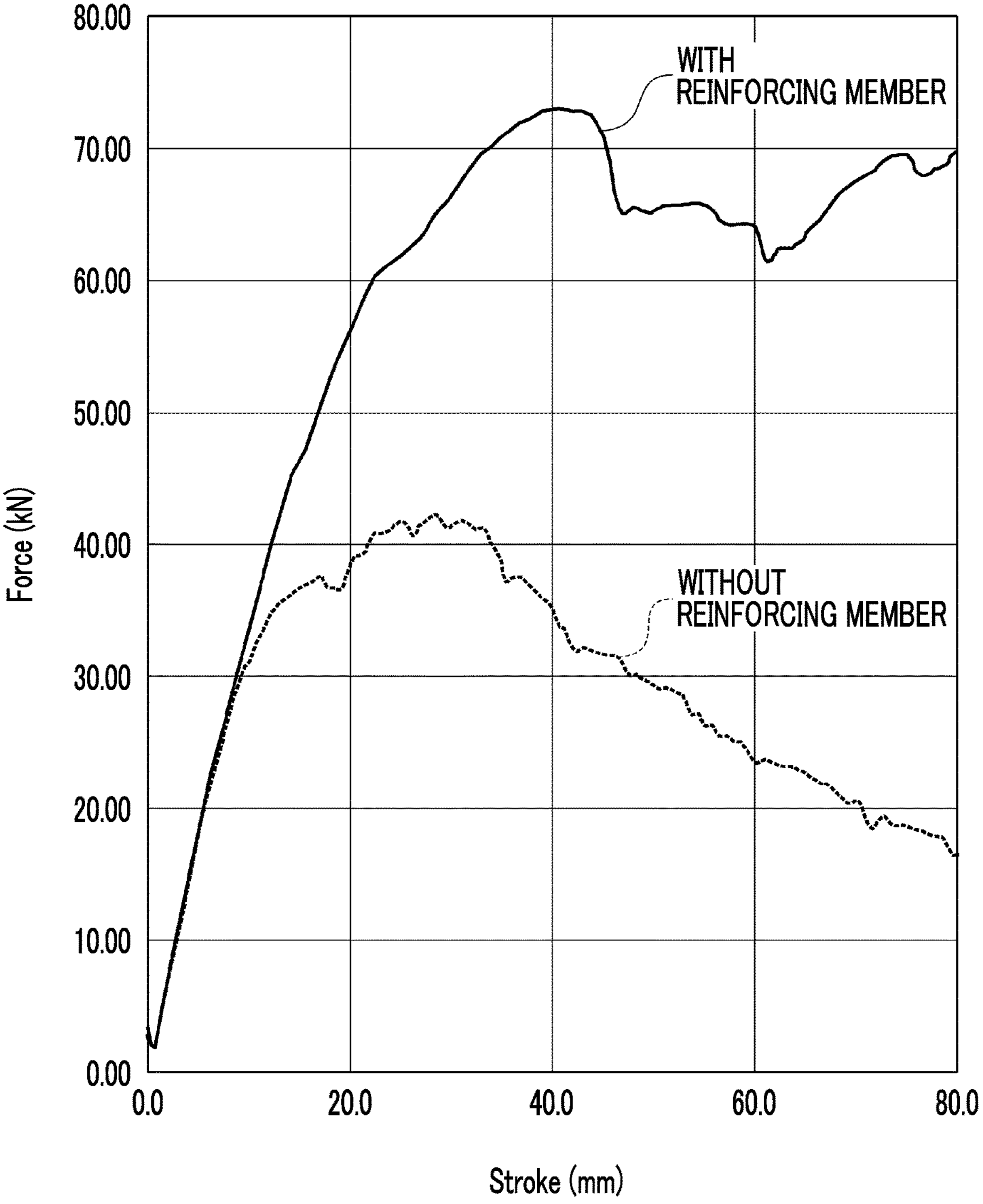
FIG. 7 is a graph showing a relationship between a reaction force obtained by the FEM analysis and a stroke amount.

FIG. 7 will be referred to. It is shown that the larger the reaction force (kN) in FIG. 7, the larger the impact absorption performance. The FEM analysis was performed on each of the reinforcing unit 10 of the embodiment described above and the reinforcing unit 10 of the reference form. The data of "with reinforcing member" in FIG. 7 is for the reinforcing unit 10 of the embodiment, and the data of "without reinforcing member" in FIG. 7 is for the reinforcing unit 10 of the reference form. As shown in FIG. 7, it can be seen that the reaction force (impact absorption performance) greatly changes according to the presence or absence of the reinforcing members 20A and 20B. In this way, the technical significance of the presence or absence of the reinforcing members 20A and 20B according to an embodiment of the present disclosure is supported.

Figure 8:
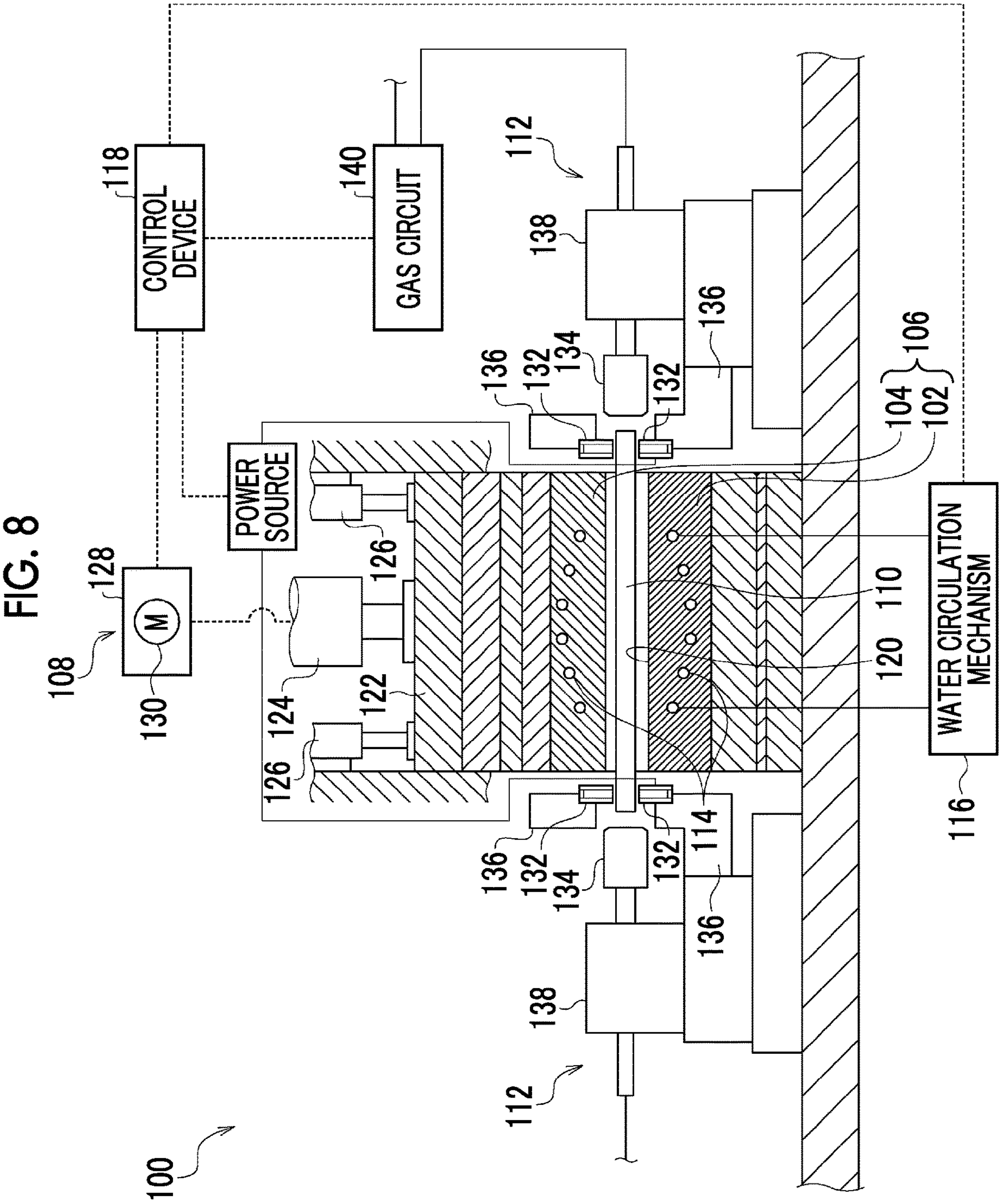
FIG. 8 is a configuration diagram showing a forming apparatus of the embodiment.

FIG. 8 will be referred to. A forming apparatus 100 for forming the beam material 18 described above will be described. The forming apparatus 100 includes a forming die 106 composed of a pair of lower die 102 and upper die 104, an upper die drive mechanism 108 for moving the upper die 104, a pair of pipe holding mechanisms 112 for holding both end portions of a raw pipe 110 which is a raw material of the beam material 18, a water circulation mechanism 116 for circulating cooling water through a cooling water passage 114 formed in the interior of the forming die 106, and a control device 118 for controlling them.

Figure 9A:
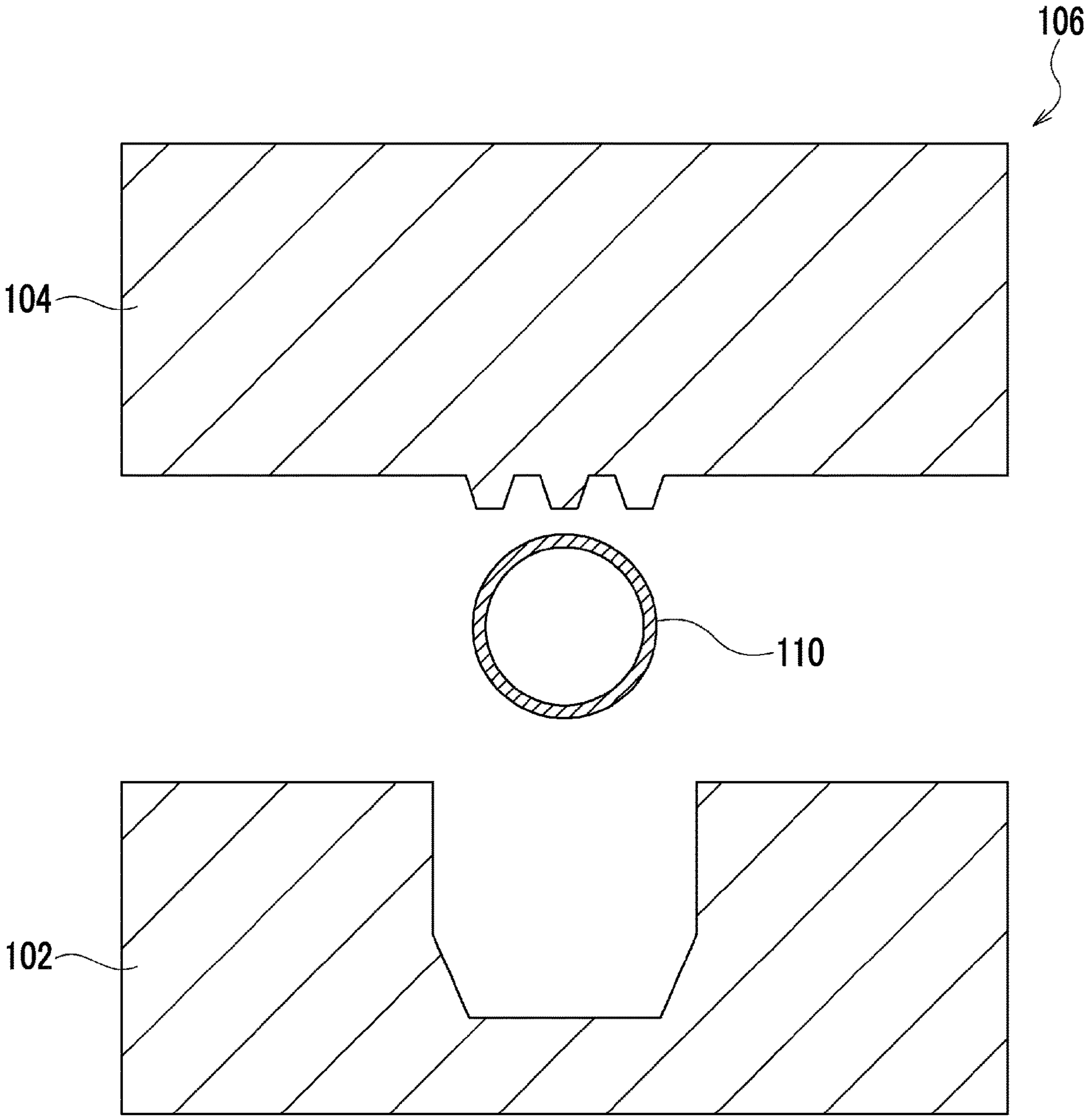
FIG. 9A is a first explanatory diagram schematically showing a forming method of the embodiment.
Figure 9B:
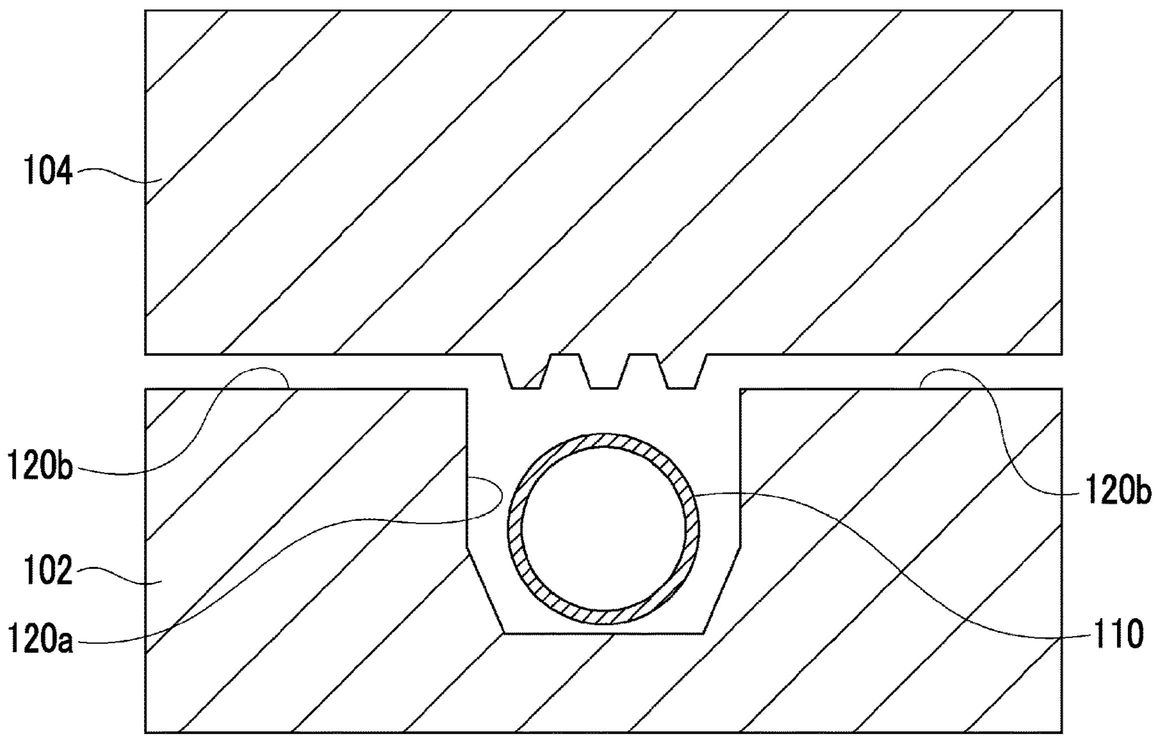
FIG. 9B is a second explanatory diagram schematically showing the forming method of the embodiment
Figure 9C:
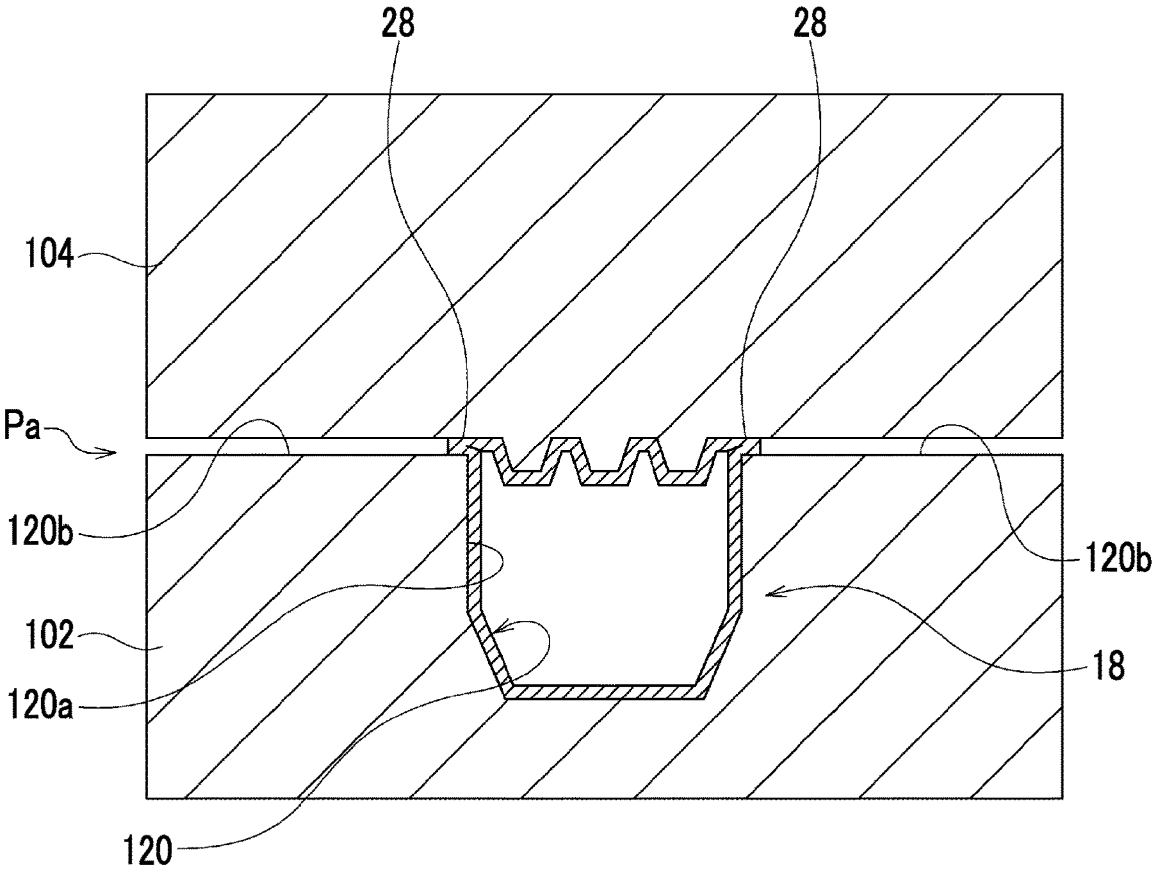
FIG. 9C is a third explanatory diagram schematically showing the forming method of the embodiment.

The forming die 106 is provided with a cavity 120 that forms a space of a target shape to be formed when the lower die 102 and the upper die 104 are in a die closing position (refer to FIG. 9C as well). The cavity 120 includes a main cavity portion 120*a* for forming the portion other than the flange portion 28 of the beam material 18, and a sub-cavity portion 120*b* for forming the flange portion 28 of the beam material 18.

The upper die drive mechanism 108 includes a slider 122 that moves the upper die 104, a main cylinder 124 that pressurizes the slider 122 downward, a pull-back cylinder 126 that pulls back the slider 122 upward, a hydraulic pump 128 that supplies pressure oil to the main cylinder 124, and a servomotor 130 that controls the hydraulic pump 128.

The pipe holding mechanism 112 is disposed by one on each of the right-left both sides of the forming die 106. The pipe holding mechanism 112 includes a pair of electrodes 132 that grip the end portions of the raw pipe 110, a nozzle 134 that supplies a compressed gas into the raw pipe 110, an electrode mounting unit 136 that supports each of the pair of electrodes 132 so as to be able to individually drive the electrodes 132, and a nozzle mounting unit 138 that supports the nozzle 134 so as to be able to move it forward and backward. The nozzle 134 is connected to a gas circuit 140 that supplies and discharges the compressed gas.

FIGS. 9A, 9B, and 9C will be referred to. The outline of a hot air blow forming method using the forming apparatus 100 described above will be described. The beam material 18 can be obtained by hot air blow forming in which the raw pipe 110 is blow-formed with a compressed gas in a heated state, by the forming apparatus 100. The following operations of the forming apparatus 100 are performed under the control of the control device 118.

First, the raw pipe 110 is disposed between the lower die 102 and the upper die 104 of the forming die 106 (refer to FIG. 9A). Next, the raw pipe 110 is gripped by the pair of electrodes 132 by moving the pair of electrodes 132 by the electrode mounting unit 136. In this state, the electrode 132 of the individual pipe holding mechanism 112 is energized to heat the raw pipe 110 by Joule heating. In this case, the raw pipe 110 is heated to a temperature range equal to or higher than an Ac3 transformation point temperature in order to quench the raw pipe 110.

Thereafter, the nozzle 134 is advanced such that the nozzle 134 is inserted into each end portion of the raw pipe 110, by controlling the nozzle mounting unit 138. Thereafter, the die closing of the forming die 106 is performed by lowering the upper die 104 until it is disposed at a die closing position Pa, by controlling the servomotor 130 of the upper die drive mechanism 108. In this case, a low-pressure compressed gas is supplied from the nozzle 134 into the raw pipe 110 in a state before the forming die 106 is completely closed, and the blow forming is started. FIG. 9B shows a state immediately before the blow forming is started. Since the raw pipe 110 is softened by the Joule heating, it can be easily expanded by the compressed gas. In this way, the raw pipe 110 expands in the main cavity portion 120*a* and expands so as to enter the sub-cavity portion 120*b*.

Thereafter, when the upper die 104 is lowered to the die closing position Pa, the die closing of the forming die 106 is completed (refer to FIG. 9C). In this way, a part of the raw pipe 110 is pressed by the lower die 102 and the upper die 104 in the sub-cavity portion 120*b*, so that the flange portion 28 of the beam material 18 is formed. Thereafter, a high-pressure compressed gas is supplied from the nozzle 134 into the raw pipe 110. In this way, the raw pipe 110 expands such that the location other than the flange portion 28 of the beam material 18 comes into contact with the main cavity portion 120*a* in the entire area of the main cavity portion

120*a*. As a result, the location other than the flange portion 28 of the beam material 18 is formed in the main cavity portion 120*a*.

In the above blow forming process, the forming die 106 is cooled by the cooling water that is circulated by the water circulation mechanism 116. The raw pipe 110 is quenched by die cooling by coming into contact with the cooled forming die 106.

Thereafter, the supply of the compressed gas is stopped, the gripping state by the pair of electrodes 132 is released, and then the upper die 104 is raised. Thereafter, the formed beam material 18 is taken out from the forming apparatus 100.

Other modification forms of each component will be described.

The reinforcing unit 10 may be a bumper beam that is used for a rear bumper that is disposed on the rear side with respect to the main body frame 12. Further, up to here, the example has been described in which the reinforcing unit 10 is disposed on the outside in the front-rear direction X as the first specific direction A with respect to the main body frame 12. In addition to this, the first specific direction A may be the right-left direction Y. In this case, the reinforcing unit 10 is disposed on the outside in the right-left direction Y with respect to the main body frame 12. This assumes a case where the reinforcing unit 10 is a bumper beam that is used for a side bumper.

The example has been described in which the beam material 18 is a molding product that is obtained by the hot air blow forming. In addition to this, the beam material 18 may be obtained by hydroforming. In this case, the beam material 18 having a continuously closed cross-sectional shape is obtained. In addition to this, the beam material 18 may be configured with a welded joint product that is obtained by welding abutting locations of a plurality of metal plates made of pressed products.

The flange portion 28 of the beam material 18 may be omitted. The flange portion 28 of the beam material 18 may be formed at an intermediate portion in the first specific direction A of each of the side surface portions 26A and 26B of the beam material 18.

The reinforcing members 20A and 20B only need to cover the side surface portions 26A and 26B of the beam material 18 from the outside so as to be able to restrain the bulging deformation of at least the side surface portions 26A and 26B, and the specific shape thereof is not particularly limited. For example, the reinforcing members 20A and 20B may cover the central portion 22*a* of the inner surface portion 22 of the beam material 18 from the frame side Sa. Further, the reinforcing members 20A and 20B do not need to be provided with the receiving portion 44. Further, the reinforcing members 20A and 20B may be provided with only the side plate portion 40 and do not need to be provided with the inner plate portion 42.

The reinforcing unit 10 only needs to include one or more reinforcing members 20A and 20B, and the number thereof is not particularly limited. The number of reinforcing members 20A and 20B may be only one or may be three or more. Further, both the upper side surface portion 26A and the lower side surface portion 26B of the beam material 18 may be covered from the outside by one reinforcing member 20A or 20B.

The cross section orthogonal to the longitudinal direction C of the beam material 18 does not need to have a closed cross-sectional shape and may have an open cross-sectional shape that is open in any direction. Further, the beam material 18 may include only one of the pair of side surface portions 26A and 26B, in addition to the inner surface portion 22 and the outer surface portion 24.

The above embodiment and modification forms are exemplification. The technical ideas that abstract these examples should not be construed to be limited to the contents of the embodiment and modification forms. Many design changes such as change, addition, and deletion of components can be made in the contents of the embodiment and modification forms. In the embodiment described above, the content in which such a design changes can be made is emphasized by adding a notation "embodiment". However, design changes are allowed even in a content in which there is no such notation. The hatching made in the cross section of the drawing does not limit the material of the object in which the hatching is made.

When the above-disclosed contents are abstracted, the technical ideas described in the following items can be grasped. A first item in the following description corresponds to the content of the "SUMMARY".

(Second item) The reinforcing unit according to the first item, in which the reinforcing member does not cover the outer surface portion from the counter-frame side and covers the side surface portion from the outside in the up-down direction.

(Third item) The reinforcing unit according to the first or second item, in which the beam material includes a flange portion that is formed at the side surface portion and protrudes outward in the up-down direction, and the reinforcing member includes a side plate portion that covers the side surface portion from the outside in the up-down direction, and a receiving portion that is provided at an outer end portion on the counter-frame side of the side plate portion and disposed on the frame side with respect to the flange portion.

(Fourth item) The reinforcing unit according to any one of the first to third items, in which the reinforcing member includes a side plate portion that covers the side surface portion from the outside in the up-down direction, and an inner plate portion that is disposed on the frame side with respect to the inner surface portion.

(Fifth item) The reinforcing unit according to any one of the first to fourth items, in which the reinforcing member does not cover a central portion in the up-down direction of the inner surface portion from the frame side.

(Sixth item) The side surface portion includes an upper side surface portion and a lower side surface portion, and one or more reinforcing members include an upper reinforcing member that covers the upper side surface portion from the outside, and a lower reinforcing member that covers the lower side surface portion from the outside and is a separate body from the upper reinforcing member.

Certain embodiment of the present disclosure relates to a reinforcing unit.

It should be understood that the invention is not limited to the above-described embodiment, but may be modified into various forms on the basis of the spirit of the invention. Additionally, the modifications are included in the scope of the invention.

What is claimed is:

1. A reinforcing unit that is mounted on a main body frame, comprising:

a beam material; and one or more reinforcing members that are mounted on an outside of the beam material, wherein the beam material substantially has a continuously closed cross-sectional shape that includes an inner surface portion that is provided on a frame side where the main body frame is located, an outer surface portion that is provided on a counter-frame side that is a side opposite to the main body frame, and a side surface portion that connects the inner surface portion and the outer surface portion, the reinforcing member is configured to selectively come into contact and restrain the side surface portion that bulges responsive to receiving an impact load at the outer surface portion, the beam material includes a flange portion that is formed at the side surface portion and protrudes outward, and the reinforcing member includes a receiving portion overlapping the flange portion and configured to selectively come into contact with the flange portion of the beam material responsive to receiving the impact load.

2. The reinforcing unit according to claim 1, wherein the beam material substantially has a closed cross-sectional shape.

3. The reinforcing unit according to claim 1, wherein the outer surface portion of the beam material is provided with a plurality of groove portions extending along a longitudinal direction of the beam material, and the plurality of groove portions are recessed in the outer surface portion to the frame side where the main body frame is located.

4. The reinforcing unit according to claim 3, wherein a through-hole through which a fastening member passes is formed in the outer surface portion.

5. The reinforcing unit according to claim 1, wherein the reinforcing member is provided along the side surface portion.

6. The reinforcing unit according to claim 5, wherein the reinforcing member covers the side surface portion from the outside.

7. The reinforcing unit according to claim 6, wherein the reinforcing member includes a side plate portion that covers the side surface portion of the beam material from the outside in an up-down direction, an inner plate portion that is disposed on the frame side, where the main body frame is located, with respect to the inner surface portion of the beam material, and the receiving portion of the side plate portion that is provided at an outer end portion that is located on the counter-frame side that is the side opposite to the main body frame.

8. The reinforcing unit according to claim 7, wherein the side plate portion extends from the frame side where the main body frame is located, toward the counter-frame side that is the side opposite to the main body frame, and covers the side surface portion from the outside in the up-down direction.

9. The reinforcing unit according to claim 8, wherein the side plate portion covers the side surface portion from the outside in the up-down direction in a range that includes a corner portion of the beam material.

10. The reinforcing unit according to claim 7, wherein the inner plate portion is disposed on the frame side with respect to the inner surface portion of the beam material, restrains deformation of the side plate portion, and restrains the bulging deformation of the side surface portion of the beam material.

11. The reinforcing unit according to claim 1, wherein the flange portion protrudes outward in an up-down direction.

12. The reinforcing unit according to claim 11, wherein the flange portion is formed by bending a part of the beam material so as to be folded.

13. The reinforcing unit according to claim 12, wherein a portion of the flange portion on the counter-frame side is continuous with the outer surface portion as a part of the outer surface portion.

14. The reinforcing unit according to claim 1, wherein the reinforcing unit is a bumper beam attached to a vehicle.

15. A reinforcing member that reinforces a beam material which is mounted on a main body frame, wherein the beam material substantially has a continuously closed cross-sectional shape that includes an inner surface portion that is provided on a frame side where the main body frame is located, an outer surface portion that is provided on a counter-frame side that is a side opposite to the main body frame, and a side surface portion that connects the inner surface portion and the outer surface portion, the reinforcing member is configured to selectively come into contact and restrain the side surface portion that bulges responsive to receiving an impact load at the outer surface portion, the beam material includes a flange portion that is formed at the side surface portion and protrudes outward, and the reinforcing member includes a receiving portion overlapping the flange portion and configured to selectively come into contact with the flange portion of the beam material responsive to receiving the impact load.

* * * * *